United States Patent [19]

Lin

[11] Patent Number: 5,054,227
[45] Date of Patent: Oct. 8, 1991

[54] LOOSENER

[76] Inventor: Kuo-Yang Lin, No. 601, Chung Cheng Road, Tsao Tun Chen, Nantou Hsien, Taiwan

[21] Appl. No.: 505,270

[22] Filed: Apr. 6, 1990

[51] Int. Cl.$^5$ ............................................. A01K 91/00
[52] U.S. Cl. .................................. 43/43.12; 43/42.04
[58] Field of Search ...................... 43/43.12, 24, 44.88, 43/42.04

[56] References Cited

U.S. PATENT DOCUMENTS

| 2,271,899 | 2/1942 | Miller | 43/43.12 |
| 2,841,911 | 7/1958 | Dahlgren | 43/43.12 |
| 3,405,476 | 10/1968 | Pumilio | 43/43.12 |
| 3,892,083 | 7/1975 | Peterson | 43/43.12 |
| 4,125,958 | 11/1978 | Cote | 43/43.12 |

FOREIGN PATENT DOCUMENTS 1063803 10/1979 Canada ............................. 43/43.12

Primary Examiner—Kurt Rowan
Assistant Examiner—Chuck Y. Mah
Attorney, Agent, or Firm—Browdy and Neimark

[57] ABSTRACT

The invention is directed to a device which permits the automatic release of a plummet or sinker when snagged during fishing and permits a connecting line for a fish hook that simultaneously produces a baffling function. The invention consists of an assembly of an interlock ring fixed to a fixture cap which returns an elastic deformable member for connecting fishing lines and hooks and holds plummets through a fishing line connected to the interlock ring. One end of the elastic member is made with a large cover fixed head fixed to the fixture cap and interlock ring. The other end of the elastic member is made up of one or more connector strips, one or more of such strips having a large convex bulb between the end of the strip and the fixed head. The cartridge can be compressed to permit the forced movement of a fishing plummet over the bulb to a fixed position between the convex bulb and the fixed head. When the plummet is snagged, upward movement of the fishing rod compresses the bulb so that it can be pulled through the plummet thereby releasing the plummet from the elastic member. Further, when a fish is caught, the elastic member to which the line is connected expands creating a baffling function which increases catches.

3 Claims, 5 Drawing Sheets

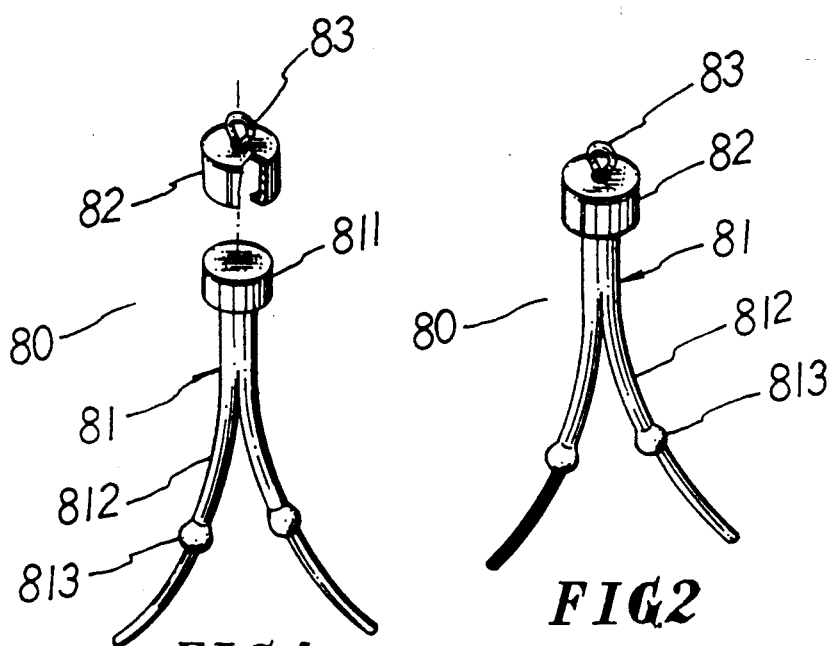
FIG.1
FIG.2
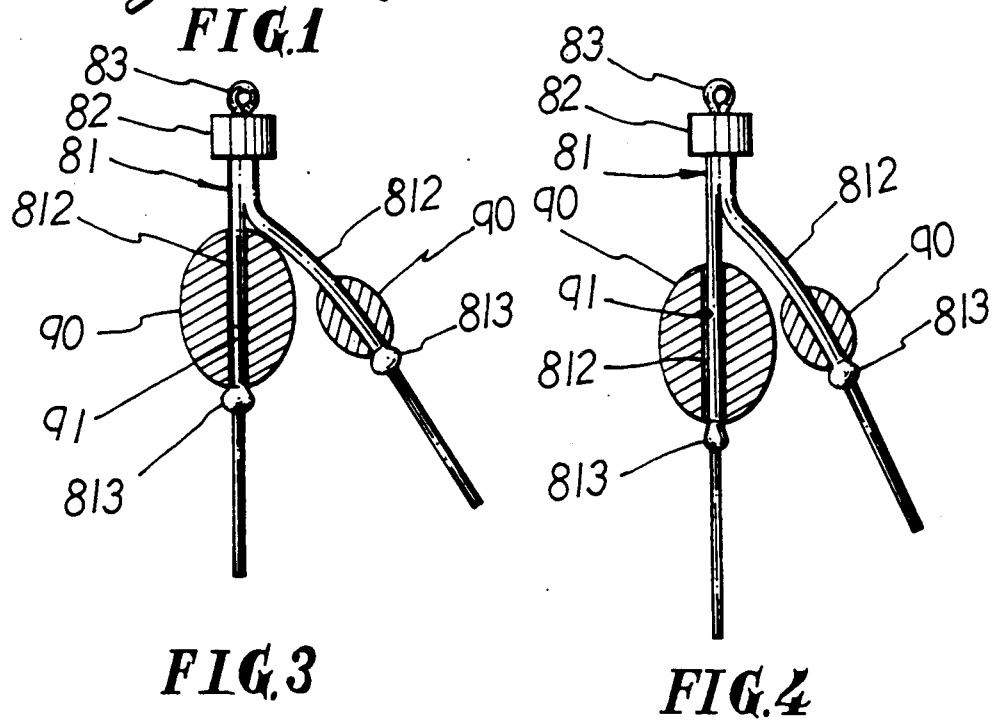
FIG.3
FIG.4

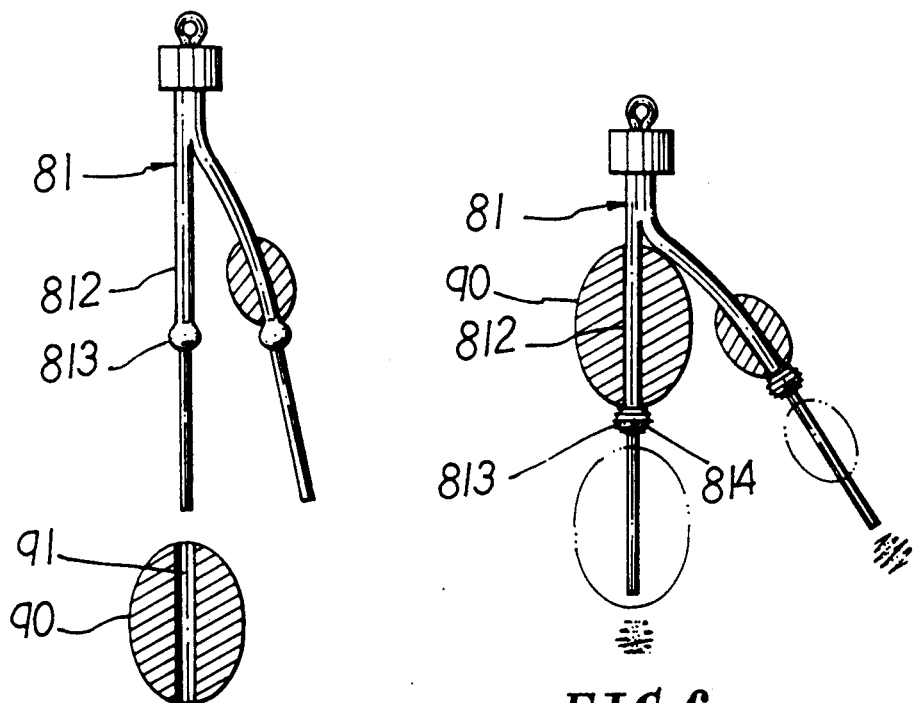
FIG. 5
FIG. 6
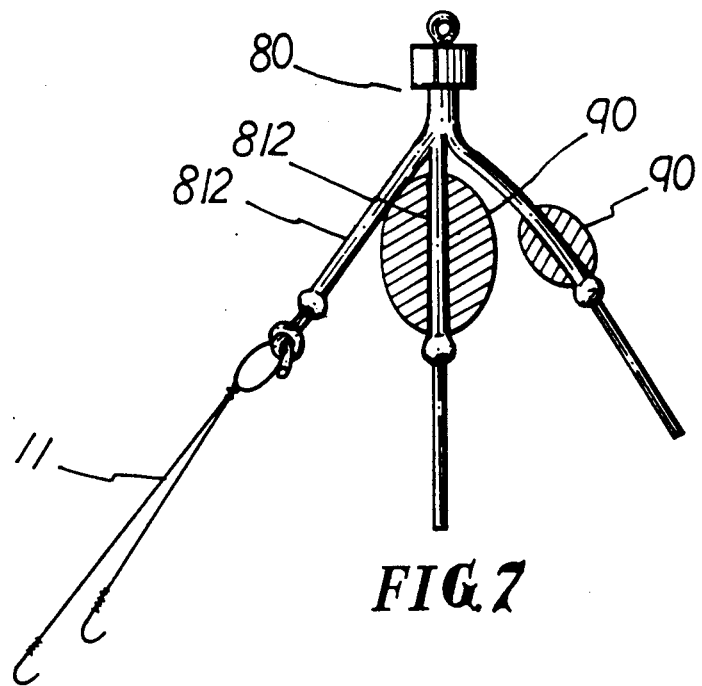
FIG. 7

LOOSENER

BACKGROUND OF THE INVENTION

1. Field of the Invention

This invention relates to releasing devices for fishing lines, and it has for its primary object the provision of an inexpensive releasing device which enables a fisherman to release his fishing line from a plummet or sinker when the latter becomes lodged in a crevice or is otherwise held beyond release beneath the surface of the water wherein the fishing operation is being carried on.

Another object of this invention is to provide an improved releasing device attachable between a sinker and a fishing line and which permits the recovery of the line with the hooks thereon when the sinker is caught and held in an inaccessible position beneath the surface of the water.

Another object of this invention is to provide an improved sinker having a releasing device embodied therein, which, when the sinker is unreleasably caught, enables the fisherman to detach the fishing line by exerting a sufficient pull thereon, and thereby effect the recovery of the line without the loss of any of the hooks carried thereby.

With these and other objects in view, the present invention consists of certain novel features of construction, combination and arrangement of parts to be hereinafter more particularly described.

2. Description of the Prior Art

According to assembly methods of the end section, general fishing line group may roughly be classified into three categories:

A. As shown on FIG. 10: Connect the interlocked ring 21 by the end section of master line 20, then, connect the interlocked ring 21 with branch line 22 to provide, from branch line 22, the fishhook 23 is connected to line 24 with separable knots, and unite the plummet assembly 25 on the end of branch line 22; such a combination may cause the following defects on its application:

1. Due to the difference of fishing environment, in addition to various sizes of current, the relative requirement of plummet weight will not be the same; however, as fishing plummet is to take a knoting method, therefore, in order to accommodate the environment, the change of fishing plummet or adding or reducing of weight, cause procession inconveniences and is much time consumption.
2. When the plummet is snagged, it is pulled up forcefully and is tend to be broken from its branch line, its breaking point is not known, but we may predict, at least, the losing of fishing plummet, or even the lose of fishing plummet, branch line and fishhook altogether which causes a waste.

B. As shown on FIG. 11: To fasten fishing plummet 31 by branch line 30, then, connect interlocked ring 31 on the end, and again provide, from interlocked ring 32, the fishhook 33 to connect line 34 and tie up fixed assembly; the fishline group by such a combination, may have the following defects on actual application:

1. It is necessary to dismantle the bottom portion of the interlocked ring before replacement or adding or reducing of fishing plummet, which takes too much time and is very inconvenient.
2. When the plummet is snagged, the end section of branch line will be broken inevitably to make the lose of all fishing plummet, interlock and fishhook.

C. As shown on FIG. 12: To connect interlock 41 by the end section of branch line 40, then, to provide, from interlocked ring 41, the fishing plummet 42 to connect line 43 and tie up a common assembly of fishhook 44 and connecting line 45 separately, by such a combination, it takes much time consumption for replacement of plummet during fishing, although when the plummet is snagged, the fishhook may not be lost, however, the fishing plummet may be lost due to breakage of connecting line and may be necessary to replace them due to insufficient length of the connecting line, it is indeed much time consumption and is very inconvenient for both replacement of plummet and tie up knots.

In view of the above three assembly methods, there are still existing difficulties for components replacement, the common uneconomical and impractical efficiency of losing too much components, the inventor, therefore, invented a fishing plummet loosener as shown in FIG. 13 and claimed in U.S. Pat. No. 4,837,968. This invention is chiefly a stringed lace 50 matching the common assembly of fishing plummet 60 with a ringed ditch 61; among them, it is equipped on the convex space surface of front section of lace 50 with two convex ears 52 with punching hole 51, and more than one pair of punching hole 53 are fixed between two convex ears 52, while on the other end section, it is equipped on the corresponding convex end section with slightly bigger gripping knot 54; may particularly be able to tie knot 50 on ringed ditch 61 of fishing plummet 60, and penetrate cartridge 54 through punching hole 53 and is tied up to fixed position and is able to provide fishing line punching knot 70 of fishing group (please refer to indications of Drawing 14), and again connects interlocked ring 71 by end section of fishing line 70, and provides, from interlocked ring 71, the connection assembly between fishhook 72 and connecting line 73. The application of such a loosener, although it has been able to achieve effective loosening when plummet is gripped, however, when the loosener is pressed on the bottom of the pressing material and could not be released automatically but might cause breakage of the fishing line and make the total lose of plummet, loosener and interlocked ring as well as fishhook as a waste.

SUMMARY OF THE INVENTION

In order to overcome the existing defects of the prior art inventions mentioned above, the invention is directed primarily to an elastic member with connectors equipped with large convex knots or cartridges in the middle. The upper section of the elastic member has a single convex larger fixed head, corresponding to a cylindrical sheathed fixture cap. The fixture cap is equipped a rotatable interlocked ring assembly on its top; so as to enable the connection with a fishing rod. When a plummet is snagged during fishing, it can deform the knots or cartridges on the connector when the fishing rod to which it is connected is pulled up forcefully. This force releases the plummet automatically to safeguard intact other components by pulling the plummet over the compressable knot.

The main purpose of this invention is to provide, when the plummet is pulled forcefully due to a snagging problem to cause deformation of the knot or cartridge to enable the loosener to be released automatically, and could protect effectively the intact assembly of other components of the fishing tackle to facilitate fisherman could release quickly the plummet and reduce the lose of components for both practical and economic efficiency.

The next purpose of this invention is to provide a loosener which could be fastened or released freely to facilitate when fisherman is fishing, he could follow different sizes of current to replace the plumet quickly to achieve aggressively its practical efficiency.

The further purpose of this invention is to provide a loosener which besides providing the assembly of the plummet, it may provide the connection between fishhook and connecting line by the connector that could entice fishes to be caught by hook for practical efficiency of protrusion baffling.

Regarding detailed structure of this case and its functional efficiency, it is introduced in detail by illustrative examples as follows:

BRIEF DESCRIPTION OF DRAWINGS

FIG. 1. Depiction of disassembled fixture cap and plastic member;

FIG. 2. Depiction of disassembled fixture cap and elastic member;

FIG. 3. Depiction of assembly of FIG. 2 with plummet.

FIG. 4. Depiction of assembly of FIG. 3 with bulb being compressed.

FIG. 5. Depiction of assembly of FIG. 4 with plummet disengaged.

FIG. 6. A different embodiment of the invention.

FIG. 7. Drawing showing assembly of fishing plummet and fishhook.

DESCRIPTION OF THE PREFERRED EMBODIMENT

Figure 8:
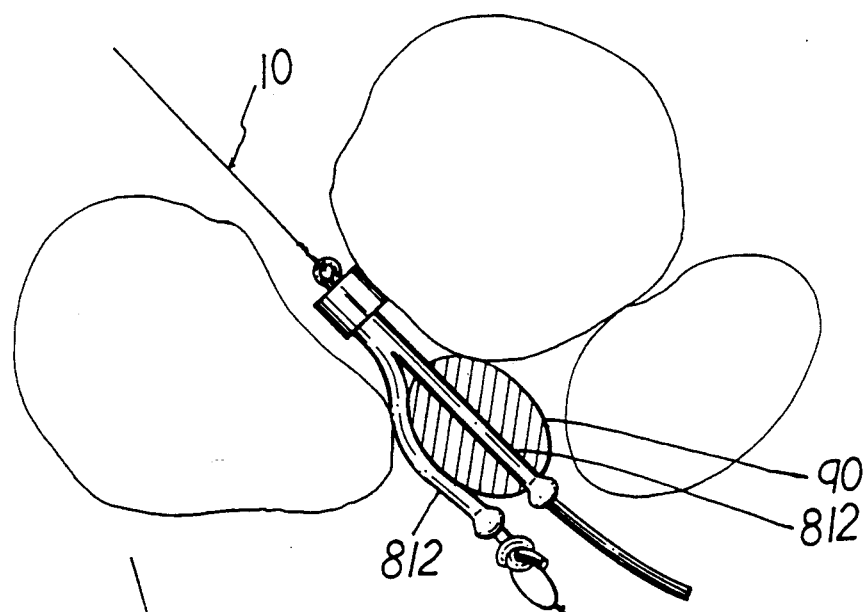
FIG. 8. Drawing showing performance of the invention.

As shown in FIGS. 1 and 2: The loosener 80 is an assembly consisting of its elastic member 81, fixture cap 82 and interlocked ring 83; among them, the elastic member 81 in one embodiment is equipped with forceful pulling and protrusion function. Elastic member 81 has at one end the convex large fixture head 811.

At the other end of 81 are one or more smaller connector 812. At the middle section of connector 812 is the convex large compressable cartridge 813; and may provide, from connector 812, the plummet to be sheathed into a fixed position or provide connection between fishhook and the connecting line.

The fixture 82 is a open downward cylindrical body, and may be sheathed on top of fixture 811 of the elastic substance 81. This is done by rivet fastening the end section of fixture 82 to stabilize and bind fixture 82 to elastic substance 81 in addition, a continuous punching hole is equipped on top of fixture 82.

The interlocked ring 83 is a ringed convex on the surface of fixture 82 and its lower section is an interlaced gripping knot fixed inside the fixture 82 and making interlocked ring to be able to rotated correspondingly with fixture; such an interlocked ring 83 may also be connected and fixed with fixture 82;

The loosener 80 as mentioned above may provide, from connector 812 of its elastic substance 81 to fasten punching hole 91 for plummet 90, and after fastening of plummet 90 with the connector 812, making cartridge 813 to penetrate through punching hole 91 and is gripped (please refer to indications of FIG. 3), makes the exterior diameter bigger than internal diameter of punching hole 91 of the plummet 90, and let plummet 90 may be binded together with the loosener 80. After operation of the loosener 80, the connector 812 of the elastic substance 81 may be pulled and deformated to further shortening of lever diameter (please refer to indications of FIG. 4). When cartridge 813 on middle section of connector 812 is shortened to smaller than internal diameter of punching hole hole 91 of the plummet 90, it will make plummet 90 to get rid of connector 812 and make a complete separation between both of them (please refer to indications of FIG. 5).

When practical application on fishing line group of this case, the interlocked ring 83 may be united, and provide, from connector 812, the plummet 90 to penetrate and connect with connecting line 11 of fishhook (please refer to indications of FIGS. 7 and 8); once such fishing line sink into water and is snagged, then the fishing plummet 90 may be released automatically, except the release and lose of fishing plummet 90, other components may still be kept intact and is connected.

Figure 9:
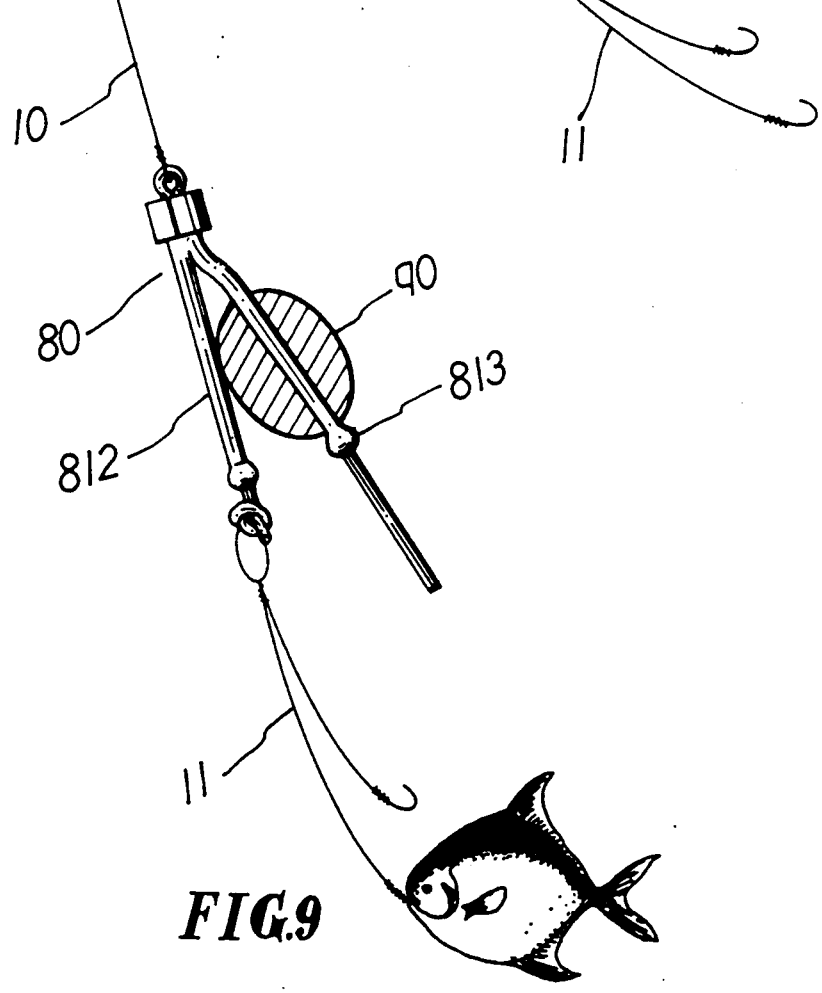
FIG. 9. Drawing showing performance of the invention.
Figure 10:
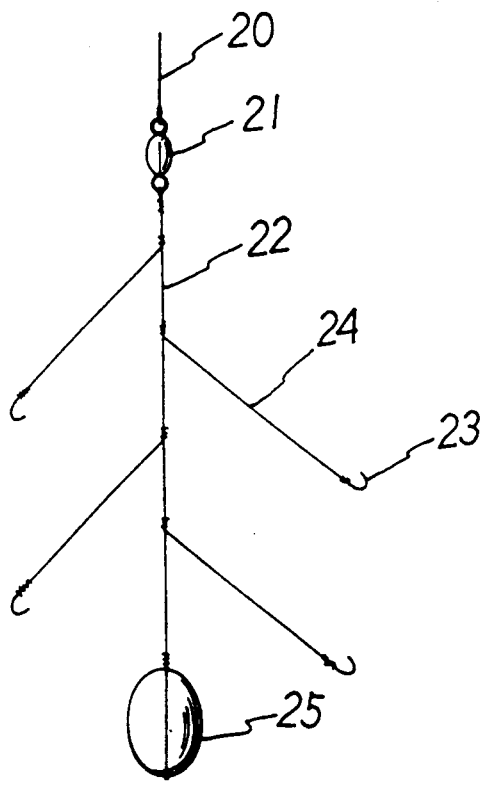
FIG. 10. Depiction of prior art.
Figure 11:
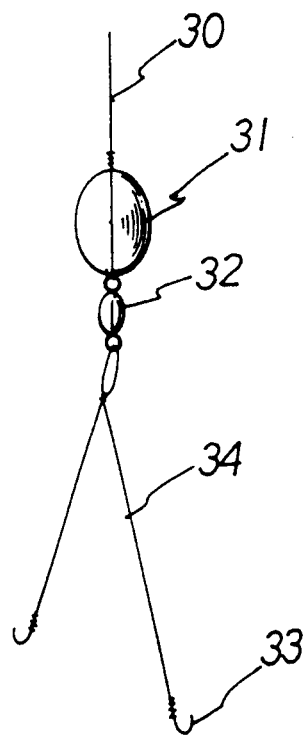
FIG. 11. Depiction of prior art.
Figure 12:
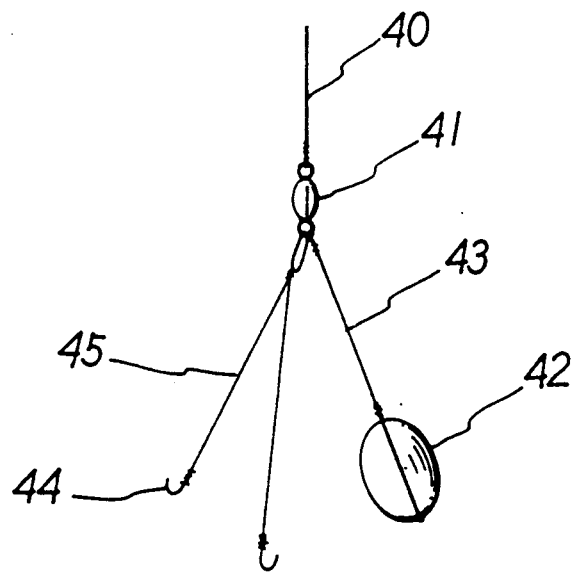
FIG. 12. Depiction of prior art.
Figure 13:
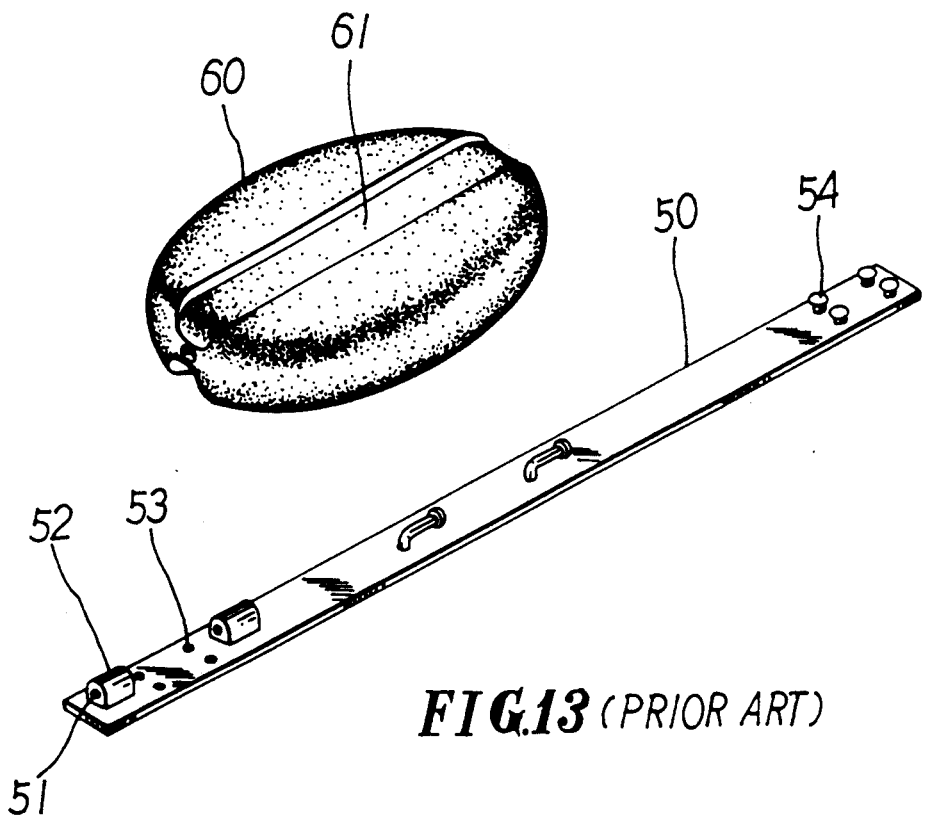
FIG. 13. Depiction of prior art.
Figure 14:
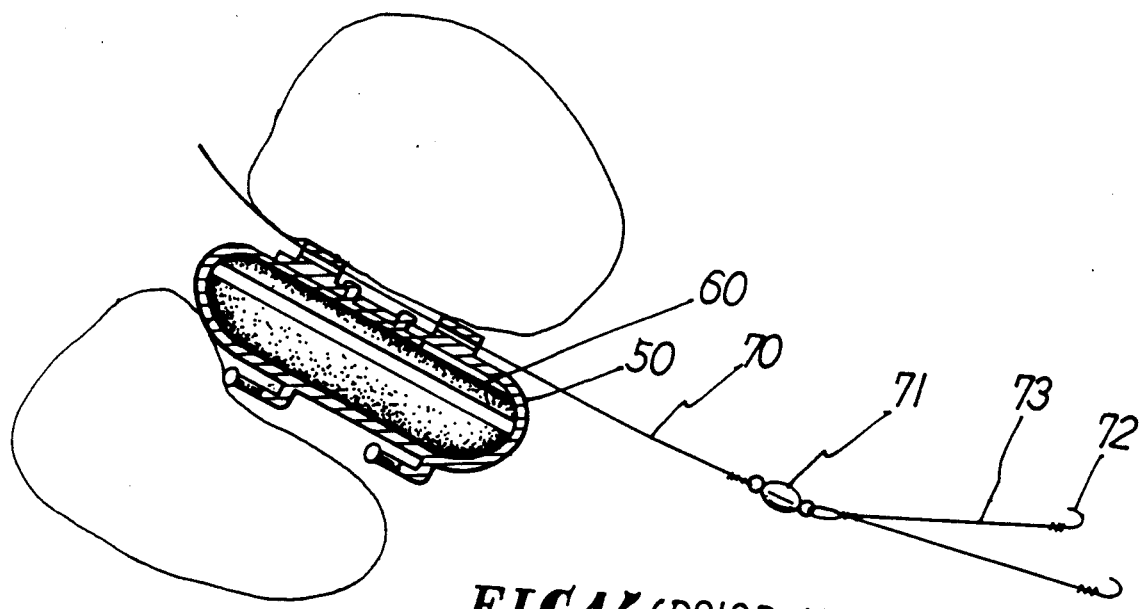
FIG. 14. Depiction of prior art.

During practical application of this case, once fishes are caught by hook (please refer to indications of FIG. 9), the flexibility of the connector 812 may baffle fishes' struggling strength and be able to get larger rate of success.

Moreover, during practical application of such a loosener, the connector 812 may be penetrated and connected directly with other fishing plummets; therefore, when sizes of current are different, the fisherman may change, anytime, the weight of fishing plummet to meet the requirement at all times, especially its practical efficiency for easy replacement of the fishing plummet.

In addition, for the elastic substance 81 of this case, the connector 812 may be used as the internal diameter where exterior diameter is slightly smaller than the punching hole 91 of the fishing plummet 90 (please refer to indications of FIG. 6); in this way, when fishing plummet 90 is penetrated, it may start from smaller path on the lower section to punch first through punching hole 91 and followed by pushing the fishing plummet 90 to the upward section as to make the expansion of the internal diameter which is forced by larger external diameter of the upper section to a fixed position for plummet 90 and for purpose of making fishing plummet to be more stable so as to be united together, this may be achieved by connecting again a buckle ring 814 on the exterior diameter of cartridge 813 to strengthen the fixed position.

I claim:

1. A loosener for automatic release of a plummet on a fishing line of a fishing rod, said loosener comprising;
   an interlock ring for connecting a fishing line to a fishing rod;
   a cylindrical fixture cap;
   a bottom of said fixture cap being open;
   said interlock ring rotatably connected to a top of said fixture cap;
   a deformable elastic member;

a fixed convex head at a first end of said elastic member;

at least one connector strip at a second end of said elastic member;

said connector strip having a diameter smaller than said convex head;

said connector strip having a deformable convex bulb between a first end of said connector strip and said fixed convex head;

said convex head fixedly mounted in said open bottom of said fixture cap;

a fishing plummet having a diameter of an axial bore smaller than the diameter of said bulb;

said convex bulb compressably moved through said axial bore of said plummet to fix said plummet on said connector between said convex bulb and said fixed head;

wherein said convex bulb is sufficiently deformable to permit said plummet to be released from said connector by an upward movement of the fishing rod when said plummet is snagged.

2. The loosener as claimed in claim 1, wherein:

a retaining ring is fastened to a exterior diameter of said convex bulb to secure the positioning of said fishing plummet.

3. The looosener as claimed in claim 1 wherein:

said elastic member haivng more than one of said connector strip at said second end of said elastic member;

one of said strips for connecting a fishing line having fishing hooks.

* * * * *